(12) United States Patent
Todorovic

(10) Patent No.: US 8,690,098 B2
(45) Date of Patent: Apr. 8, 2014

(54) AIR EJECTOR NOZZLE TUBE FOR AN OIL HEAT EXCHANGER OF AN AIRCRAFT ENGINE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 376 days.

(21) Appl. No.: 13/039,795

(22) Filed: Mar. 3, 2011

(65) Prior Publication Data
US 2011/0215172 A1    Sep. 8, 2011

(30) Foreign Application Priority Data

Mar. 4, 2010 (DE) .......................... 10 2010 010 128

(51) Int. Cl.
*B64D 33/10* (2006.01)

(52) U.S. Cl.
USPC .............. 244/57; 244/207; 60/39.08; 165/41; 165/44

(58) Field of Classification Search
USPC ........... 244/53 R, 55, 57, 207; 60/39.08, 266, 60/267, 39.83, 771, 767, 768; 239/265.19, 239/265.11–265.41, 239; 417/151–198; 165/41, 44, 51
See application file for complete search history.

(56) References Cited

U.S. PATENT DOCUMENTS

| 1,412,073 | A | * | 4/1922 | Wagenseil | 244/57 |
| 1,730,978 | A | * | 10/1929 | Lepere | 244/57 |
| 2,117,632 | A | * | 5/1938 | Sikorsky | 244/57 |
| 2,352,144 | A | * | 6/1944 | Woods | 244/204 |
| 4,763,842 | A | * | 8/1988 | Dunn | 239/542 |
| 4,782,658 | A | * | 11/1988 | Perry | 60/226.1 |
| 5,106,021 | A | * | 4/1992 | Gilead | 239/276 |
| 5,520,339 | A | * | 5/1996 | Kuo | 239/542 |
| 5,806,793 | A | | 9/1998 | Brossier et al. | |
| 5,987,877 | A | | 11/1999 | Steiner | |
| 6,282,881 | B1 | | 9/2001 | Buetin et al. | |
| 6,931,834 | B2 | * | 8/2005 | Jones | 60/226.1 |

(Continued)

FOREIGN PATENT DOCUMENTS

| DE | 19524731 | 1/1997 |
| DE | 60219939 | 1/2008 |

(Continued)

OTHER PUBLICATIONS

European Search Report dated Nov. 21, 2013 for counterpart European Application No. 11001798.5.

*Primary Examiner* — Tien Dinh
*Assistant Examiner* — Michael A Fabula
(74) *Attorney, Agent, or Firm* — Timothy J. Klima; Shuttleworth & Ingersoll, PLC

(57) ABSTRACT

An ejector nozzle tube, having along its length an essentially constant, essentially oval hollow cross-section, with a leading edge nozzle, having a rounded exterior cross-section, being arranged at a flow leading-edge area of the ejector nozzle tube. The leading edge nozzle includes a plurality of grooves issuing to the top and bottom sides of the ejector nozzle tube and connecting to an interior of the ejector nozzle tube formed by the hollow profile. An aircraft engine has an optimized oil heat exchanger with at least one oil cooler disposed in a trailing-edge area of an aerofoil-type structure, with at least one flow entrance area being provided to supply ambient air to the oil cooler disposed in a flow duct. The ejector nozzle tube can be arranged downstream of the oil cooler in the flow duct.

20 Claims, 2 Drawing Sheets

(56) References Cited

U.S. PATENT DOCUMENTS

Figure 1:
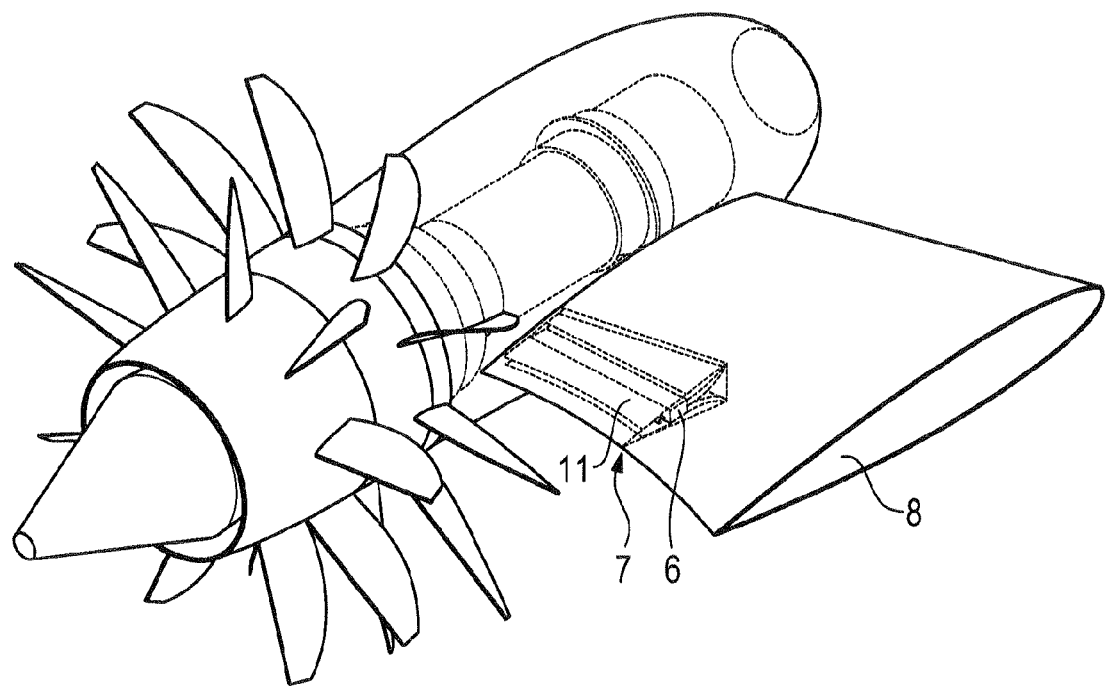

| | | |
|---|---|---|
| 6,942,181 B2 | 9/2005 | Dionne |
| 7,213,391 B2 * | 5/2007 | Jones .......................... 60/226.1 |
| 7,520,465 B2 * | 4/2009 | Mahjoub ........................ 244/57 |
| 7,971,826 B2 * | 7/2011 | Journade et al. ............... 244/54 |
| 8,276,392 B2 | 10/2012 | Van Der Woude |
| 8,297,038 B2 * | 10/2012 | Stretton ......................... 60/204 |
| 8,480,032 B2 * | 7/2013 | Todorovic ................ 244/134 B |
| 2006/0196633 A1 * | 9/2006 | Mahjoub ........................ 165/41 |
| 2009/0095446 A1 | 4/2009 | Hamstra et al. |
| 2009/0314004 A1 | 12/2009 | Van Der Woude |
| 2010/0224348 A1 * | 9/2010 | Todorovic ..................... 165/177 |

FOREIGN PATENT DOCUMENTS

| | | |
|---|---|---|
| DE | 102008028987 | 12/2009 |
| EP | 1018468 | 7/2000 |
| EP | 2136052 | 12/2009 |

* cited by examiner

AIR EJECTOR NOZZLE TUBE FOR AN OIL HEAT EXCHANGER OF AN AIRCRAFT ENGINE

This invention relates to an aircraft engine with optimized oil heat exchanger and an ejector nozzle tube associated therewith.

It is known from the state of the art that the airflow resulting from low inflow velocities of an aircraft, for example during taxiing or in the initial take-off phase, is not sufficient to provide an adequate cooling effect for an oil heat exchanger (air-flown oil cooler) or another type of heat exchanger.

It is therefore known from the state of the art to provide for augmentation of the airflow. This can be accomplished by different approaches, for example by way of an electrically or mechanically operated fan or inlet flaps delivering more air to the heat exchanger.

It is here also known from the state of the art to provide for acceleration or augmentation of the airflow by means of ejector nozzles.

The solutions known from the state of the art are disadvantageous in that they lack effectiveness under some operating conditions. Moreover, due to the conduction of flow, a considerable noise potential is encountered which is undesirable.

A broad aspect of the present invention is to provide an aircraft engine with optimized oil heat exchanger and an ejector nozzle tube, which, while being simply designed and easily and cost-effectively applicable, avoid the disadvantages of the state of the art, assure effective heat transfer and keep the noise level low.

It is a particular object of the present invention to provide a solution to the above problems by a combination of the features described herein. Further advantageous embodiments of the present invention become apparent from the present description.

According to the present invention, it is therefore provided that the aircraft engine has at least one oil cooler-heat cooler/heat exchanger disposed in a trailing-edge area of an aerofoil-type structure. The latter can be a pylon for mounting the engine or a part of the wing design.

Furthermore, at least one flow entrance area is provided to supply air from the ambient flow to the oil cooler disposed in a flow duct. Downstream of the oil cooler, an ejector nozzle tube according to the present invention is arranged which is designed such that an optimized flow is obtained in the area of the ejector nozzle tube. Compared with the state of the art, this flow has a substantially minimized noise potential, thus providing for optimization of the flow through the oil cooler/heat exchanger on the one hand, and, on the other hand, for drastic minimization of noise.

The ejector nozzle tube according to the present invention has, along its length, an essentially constant, essentially oval or S-shaped cross-section which is hollow to introduce an additional airflow through the ejector nozzle tube. According to the present invention, it is provided that, at the flow leading-edge area of the ejector nozzle tube, exit ports/nozzles are arranged through which the flow supplied through the ejector nozzle tube issues near the boundary and streams in an essentially laminar flow along the surface of the ejector nozzle tube cross-section.

For this purpose, the ejector nozzle tube according to the present invention is, in its flow leading-edge area, provided with an inflow lip (leading edge nozzle) with rounded or arcuate cross-section. The inflow lip has a plurality of grooves opening to the top and bottom sides of the ejector nozzle tube cross-section. The center area of the grooves connects to the interior of the ejector nozzle tube, thus ensuring the supply of air via the grooves.

In accordance with the present invention, the inflow lip can in a simple manner be made as milled component and welded to the remaining sheet-type structure (bent structure) of the ejector nozzle tube. This provides for particularly cost-effective producibility.

Operation of the ejector nozzle tube according to the present invention is based on the arrangement of the ejector nozzles at the inflow edge. Thus, a flow along the surface of the ejector nozzle tube is produced which, compared to the designs known from the state of the art, provides for substantially improved operation. On the ejector nozzle tubes according to the state of the art, it is known to arrange the nozzles at the outflow edge (trailing edge).

In the configuration according to the present invention, the fluid particles, which are supplied to the ejector nozzle tube upon issuing from the oil cooler/heat exchanger, are accelerated by friction with the fluid particles issuing from the nozzles of the inflow lip. The velocity difference between the respective particles produces friction and transfers kinetic energy from the flow issuing from the nozzles of the ejector nozzle tube to the flow issuing from the oil cooler. Thus, acceleration of the entire flow is effected.

According to the present invention, it is further particularly favourable if the flow duct is geometrically adaptable. For this, it is particularly favourable to provide at least one variable wall element. Preferably, an upper and a lower variable wall element designed as pivotal flaps are provided. This enables the cross-section of the flow duct to be changed and, as a result of structuring, the flow conditions to be further influenced, in particular by providing an additional nozzle by means of the two pivotal flaps.

Figure 3:
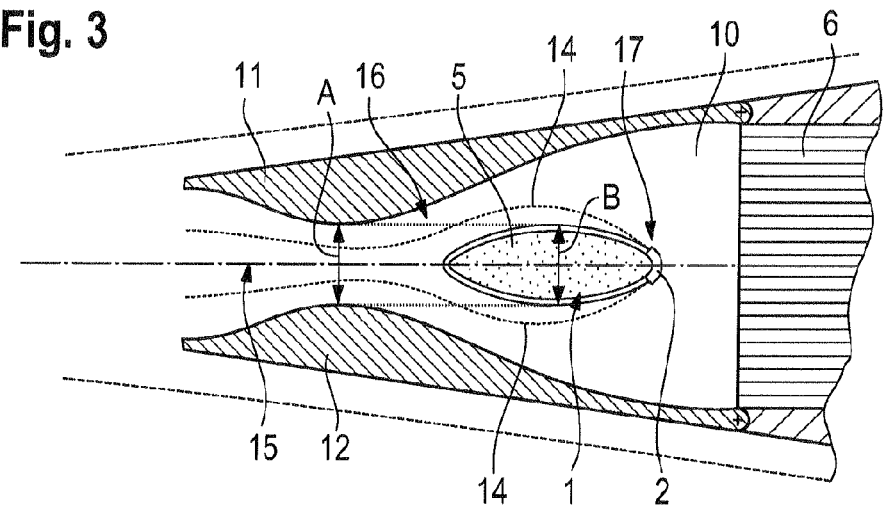
Figure 4:
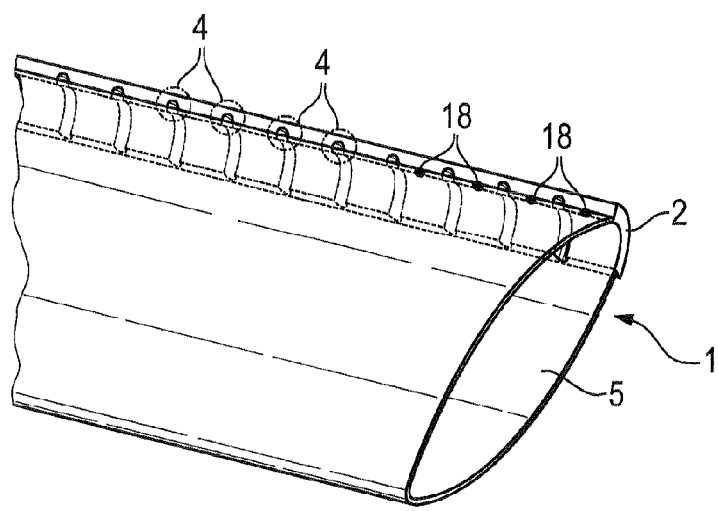
Figure 5:
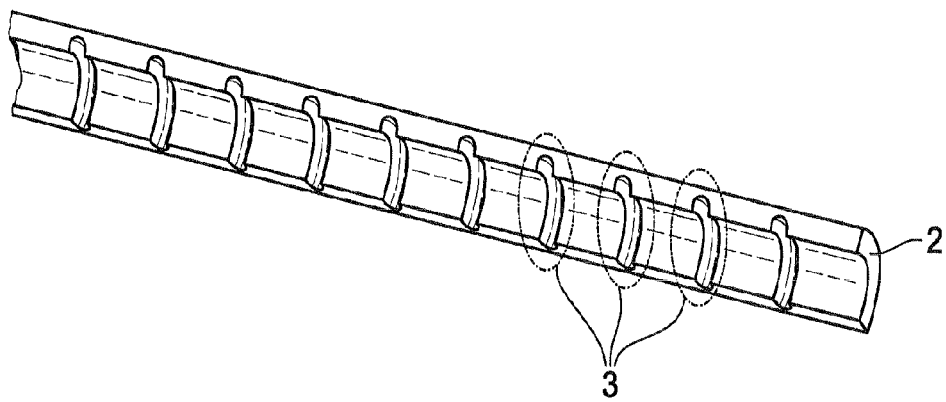

The present invention is more fully described in light of the accompanying drawings showing a preferred embodiment. In the drawings, FIG. 1 is a perspective simplified representation of an aircraft engine with a gas turbine and two counter-rotating pusher propellers, FIG. 2 is a simplified sectional view of the inventive area with oil cooler and ejector nozzle tube, FIG. 3 is an enlarged detail view, analogously to FIG. 2, and FIGS. 4 and 5 are simplified perspective representations of the ejector nozzle tube and the inflow lip.

FIG. 1 shows a gas-turbine engine with two counter-rotating pusher propellers. Such designs are known from the state of the art so that a detailed description is dispensable here.

The gas-turbine engine is borne on an aerofoil-type structure 8, for example a pylon or a wing.

Figure 2:
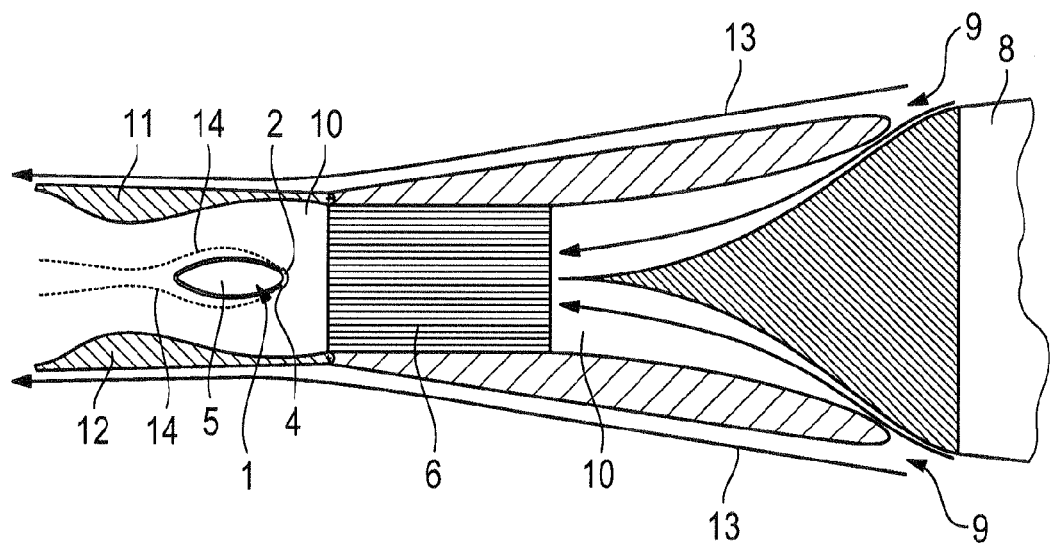

In the outflow area of the structure 8, the arrangement according to the present invention is disposed as shown in FIG. 2.

FIG. 2 shows the outflow area of the structure 8. The outflow area 8 has upper and lower flow entrance areas 9 which are slot-shaped each. Thus, part of the flow 13 streaming over the structure 8 is deflected and supplied to a flow duct 10. Arranged in the flow duct 10 is an oil cooler/heat exchanger 6 passed by the flow.

At too low a velocity of the flow 13, the amount of air flowing to the oil cooler/heat exchanger 6 is too small, compromising the operation of the latter.

At the outflow area of the oil cooler/heat exchanger 6, an ejector nozzle tube 1 is arranged in the flow duct 10 which hereinafter is described in detail in connection with FIGS. 3 to 5.

Also arranged on the outflow side of the oil cooler/heat exchanger 6 are an upper pivotal flap 11 and a lower pivotal flap 12 (structured wall elements) of which each is pivotable about an essentially horizontal axis. This enables the flow to be optimized as illustrated below.

FIG. 3 shows an enlarged representation, analogously to FIG. 2.

Provided with an interior enabling the supply of an additional airflow, the ejector nozzle tube 1 has an aerodynamically optimized, essentially oval cross-section which is constant along its length.

On the inflow side of the ejector nozzle tube, an inflow lip 2 is provided. The latter has a thicker cross-section and is provided as milled component, for example. The remaining wall area of the ejector nozzle tube 1 is provided as sheet-metal bent component (see also FIGS. 4 and 5).

A flow 14 issues through exit ports 4 (nozzle-type recesses) which streams adjacent to the contour of the ejector nozzle tube 1 and is aerodynamically optimizable.

The area of the flow duct 10 in which the ejector nozzle tube 1 is arranged is contoured by the upper pivotal flap 11 and the lower pivotal flap 12, thus providing a discharge nozzle 15 producing additional thrust.

The air supplied to the ejector nozzle tube 1 is usually bleed air of the gas turbine of the aircraft engine.

Optimization of flow and minimization of noise are obtained in the area indicated by arrowhead 16, in particular by appropriately contouring the pivotal flaps 11, 12. Minimization of noise is a major aspect of the present invention, with the generation of noise of the issuing airflow being substantially decreasable relative to the state of the art. In the operating state, which is shown in FIG. 3, the free cross-section between the pivotal flaps 11 and 12, which is shown as double arrow A in FIG. 3, is equal to or less than the maximum total thickness of the oval or S-shaped cross-section of the ejector nozzle tube 1. This thickness is shown by the double arrow B in FIG. 3. Accordingly, the following equation applies: $A \leq B$ Arrowhead 17 in FIG. 3 indicates the exit of the ejector flow at the inflow area of the ejector nozzle tube.

FIGS. 4 and 5 illustrate the configuration in particular of the inflow lip 2. The latter has arcuate grooves 3 which feature an essentially constant cross section and extend in conformity with the arcuation of the inflow lip 2. In the grooves 3, the flow supplied in the interior 5 of the ejector nozzle tube 1 is conductable and dischargeable via the nozzles 4. The inflow lip 2 is joinable to the sheet-metal bent construction of the main part of the ejector nozzle tube 1 by spot welds 18, for example. An essential aspect of the present invention is the simple and cost-effective producibility of the ejector nozzle tube 1. The latter can be provided as simple, inexpensive sheet-metal bent component, with the cross-sectional shape being easily and inexpensively producible. Likewise, the inflow lip 2 is producible in the form of a simple, inexpensive milled component which is joinable to the sheet-metal bent construction of the body proper of the ejector nozzle tube in a simple manner, for example by welding. The milled construction of the inflow lip allows the grooves, and also the exit ports for the flow issuing from the ejector nozzle tube, to be simply and inexpensively produced.

LIST OF REFERENCE NUMERALS

1 Ejector nozzle tube
2 Inflow lip
3 Groove
4 Nozzle/recess/exit port
5 Interior
6 Oil cooler/heat exchanger
7 Trailing-edge area
8 Structure
9 Flow entrance area
10 Flow duct
11, 12 Wall element/pivotal flap
13, 14 Flow
15 Discharge nozzle
16 Minimization of noise
17 Flow supply
18 Spot weld

What is claimed is:

1. An ejector nozzle tube intended to be positioned longitudinally in an aircraft airfoil having a duct, downstream of an inlet of the duct and an oil cooler heat exchanger located within the duct, comprising:

a main body having an essentially constant, essentially oval cross-section along a length thereof and having a hollow interior, the essentially oval cross-section having a first narrow side, a second narrow side opposite the first narrow side and a wider central portion positioned between the first narrow side and the second narrow side, the first narrow side establishing a leading edge area and the second narrow side establishing a trailing edge area such that a fluid flow past the main body flows in a downstream direction from the leading edge area to the trailing edge area;

a leading edge lip element having a rounded exterior cross-section and being attached to the main body at the leading edge area, the leading edge lip element including a plurality of grooves positioned spaced apart along the length of the main body and connecting to the hollow interior to form a plurality of nozzles for fluid passage between the hollow interior and an exterior of the main body, wherein the ejector nozzle tube is configured to receive bleed air from the engine and pass the bleed air along the length of the ejector nozzle tube to the plurality of nozzles, the plurality of nozzles issuing the bleed air to an exterior surface of the ejector nozzle tube at the leading edge area and in the downstream direction to form a near surface flow along an exterior surface of the main body from the leading edge lip element toward the trailing edge area.

2. The ejector nozzle tube of claim 1, wherein the main body of the ejector nozzle tube has a smaller wall thickness than the leading edge lip element.

3. The ejector nozzle tube of claim 2, further comprising a plurality of connections between the main body and the leading edge lip element positioned between the plurality of grooves.

4. The ejector nozzle tube of claim 1, wherein the grooves are arranged in the sectional planes of the ejector nozzle tube that are perpendicular to a longitudinal axis of the ejector nozzle tube.

5. The ejector nozzle tube of claim 4, wherein the main body of the ejector nozzle tube is made of sheet metal, with at least a portion of the leading edge area being open to the interior, the leading edge lip element having a thicker wall thickness than a wall thickness of the main body.

6. The ejector nozzle tube of claim 5, further comprising a plurality of weld connections between the main body and the leading edge lip element positioned between the plurality of grooves.

7. The ejector nozzle tube of claim 4, further comprising a plurality of connections between the main body and the leading edge lip element positioned between the plurality of grooves.

8. The ejector nozzle tube of claim 1, wherein the main body of the ejector nozzle tube is made of sheet metal, with at least a portion of the leading edge area being open to the interior, the leading edge lip element having a thicker wall thickness than a wall thickness of the main body.

9. The ejector nozzle tube of claim 8, further comprising a plurality of weld connections between the main body and the leading edge lip element positioned between the plurality of grooves.

10. The ejector nozzle tube of claim 1, further comprising a plurality of connections between the main body and the leading edge lip element positioned between the plurality of grooves.

11. A cooling arrangement for an aircraft engine comprising:
a flow duct positioned in an airfoil structure;
an oil heat exchanger with at least one oil cooler positioned in the flow duct in a trailing edge area of the airfoil structure;
the flow duct including at least one flow entrance area for supplying a flow of ambient air to the oil cooler;
an ejector nozzle tube positioned downstream of the oil cooler in the flow duct and extending in a longitudinal direction in the airfoil structure;
the ejector nozzle tube comprising:
a main body having an essentially constant, essentially oval cross-section along a length thereof and having a hollow interior, the essentially oval cross-section having a first narrow side, a second narrow side opposite the first narrow side and a wider central portion positioned between the first narrow side and the second narrow side, the first narrow side establishing a leading edge area facing in an upstream direction of the flow and the second narrow side establishing a trailing edge area facing in a downstream direction of the flow;
a leading edge lip element having a rounded exterior cross-section and being attached to the main body at the leading edge area, the leading edge lip element including a plurality of grooves positioned spaced apart along the length of the main body and connecting to the hollow interior to form a plurality of nozzles for fluid passage between the hollow interior and an exterior of the main body, wherein the ejector nozzle tube is configured to receive bleed air from the engine and pass the bleed air along the length of the ejector nozzle tube to the plurality of nozzles, the plurality of nozzles issuing the bleed air to an exterior surface of the ejector nozzle tube at the leading edge area and in the downstream direction to form a near surface flow along an exterior surface of the main body from the leading edge lip element toward the trailing edge area.

12. The cooling arrangement in accordance with claim 11, wherein the flow duct downstream of the oil cooler is formed by at least one variable wall element.

13. The cooling arrangement in accordance with claim 12, wherein the at least one variable wall element includes at least one aerodynamically contoured pivotal flap.

14. The cooling arrangement in accordance with claim 13, wherein the at least one variable wall element includes an upper and a lower contoured pivotal flap opposing one another.

15. The cooling arrangement of claim 14, wherein the main body of the ejector nozzle tube is made of sheet metal, with at least a portion of the leading edge area being open to the interior, the leading edge lip element having a thicker wall thickness than a wall thickness of the main body.

16. The cooling arrangement of claim 15, further comprising a plurality of weld connections between the main body and the leading edge lip element positioned between the plurality of grooves.

17. The cooling arrangement of claim 11, wherein the main body of the ejector nozzle tube is made of sheet metal, with at least a portion of the leading edge area being open to the interior, the leading edge lip element having a thicker wall thickness than a wall thickness of the main body.

18. The cooling arrangement of claim 17, further comprising a plurality of weld connections between the main body and the leading edge lip element positioned between the plurality of grooves.

19. The cooling arrangement of claim 11, wherein the main body of the ejector nozzle tube has a smaller wall thickness than the leading edge lip element.

20. The cooling arrangement of claim 19, further comprising a plurality of connections between the main body and the leading edge lip element positioned between the plurality of grooves.

* * * * *